(12) United States Patent
Schmidt et al.

(10) Patent No.: US 11,498,663 B2
(45) Date of Patent: Nov. 15, 2022

(54) CLUTCH ASSEMBLY FOR AUTONOMOUS TAXIING OF AIRCRAFT

(71) Applicant: SAFRAN LANDING SYSTEMS CANADA INC., Ajax (CA)

(72) Inventors: Robert Kyle Schmidt, Brooklin (CA); Steve Amberg, Toronto (CA); Jason Brown, Utterson (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 205 days.

(21) Appl. No.: 16/793,898

(22) Filed: Feb. 18, 2020

(65) Prior Publication Data

US 2021/0253227 A1    Aug. 19, 2021

(51) Int. Cl.
*B64C 25/40*    (2006.01)

(52) U.S. Cl.
CPC .................................. *B64C 25/405* (2013.01)

(58) Field of Classification Search
CPC .................................................... B64C 25/405
See application file for complete search history.

(56) References Cited

U.S. PATENT DOCUMENTS

| | | | | |
|---|---|---|---|---|
| 2,425,583 | A * | 8/1947 | Volk ...................... | B64C 25/405 244/103 S |
| 5,020,419 | A * | 6/1991 | Amedei .................. | F16H 61/30 92/52 |
| 7,445,575 | B2 * | 11/2008 | Capito .................... | F16D 11/04 475/204 |
| 9,540,097 | B2 | 1/2017 | Schmidt et al. | |
| 10,457,385 | B2 * | 10/2019 | Essinger ............... | B64C 25/405 |
| 10,752,352 | B2 * | 8/2020 | Brand ..................... | B64C 11/28 |
| 11,332,236 | B2 * | 5/2022 | Cox ..................... | B60B 27/0021 |
| 2010/0065678 | A1 | 3/2010 | Kiyosawa | |
| 2012/0126053 | A1 * | 5/2012 | Christensen .......... | F16D 41/125 244/50 |
| 2014/0332622 | A1 * | 11/2014 | Charles ................. | B64C 25/405 244/50 |
| 2016/0096619 | A1 * | 4/2016 | Daffos .................... | B64C 25/42 244/103 R |

FOREIGN PATENT DOCUMENTS

FR    2954236 A1    6/2011
JP    2007112408 A    5/2007

OTHER PUBLICATIONS

Written Opinion of the International Searching Authority dated May 20, 2021, issued in corresponding International Application No. PCT/CA2021/050173, filed Feb. 17, 2021, 5 pages.
International Search Report dated May 20, 2021, issued in corresponding International Application No. PCT/CA2021/050173, filed Feb. 17, 2021, 3 pages.

* cited by examiner

*Primary Examiner* — Joshua J Michener
*Assistant Examiner* — Ryan Andrew Yankey
(74) *Attorney, Agent, or Firm* — Christensen O'Connor Johnson Kindness PLLC (57) ABSTRACT

A landing gear system includes an axle having an internal cavity and a wheel rotatably coupled to the axle. A drive shaft is mounted within the cavity to be rotatable about an axis. The landing gear system further includes a rod slidably mounted within the drive shaft and a clutch. The clutch has a first portion that is coupled to the rod and rotates with the drive shaft. A second portion of the clutch is fixedly coupled to the wheel. The rod selectively reciprocates along the axis between a first position and a second position to engage and disengage the clutch.

17 Claims, 8 Drawing Sheets

CLUTCH ASSEMBLY FOR AUTONOMOUS TAXIING OF AIRCRAFT

BACKGROUND

Autonomous taxiing systems provide drive capabilities to one or more wheels of an aircraft. By utilizing electric or hydraulic motors (or other power sources) to drive the wheels, operators can push back from gates and taxi without having to use their jet engines or tow tractors. As a result, fuel costs, wear and maintenance on the jet engines, and noise are all reduced.

When implementing an autonomous taxiing system, it is desirable to provide a clutch that isolates the driven wheel from the driving mechanism. Ideally, this clutch is arranged such that the autonomous taxi equipment does not introduce any additional rotating failure modes compared to a landing gear without the autonomous taxi equipment. For instance, with the clutch disengaged, there should be no additional rotating bearings, shafts, or other components that could fail and introduce a retarding torque during aircraft acceleration for takeoff.

U.S. Pat. No. 9,540,097, issued to Schmidt et al., ("Schmidt") and currently assigned to Safran Landing Systems, the disclosure of which is expressly incorporated herein, teaches the use of drive shafts housed within the landing gear axle to drive the aircraft wheels. Schmidt generally explains that the drive shafts may be provided with couplers for selectively coupling or uncoupling the drive shafts from the wheels. When the couplers are uncoupled, untimely powering of the motors does not rotate the wheels and does not cause a reaction torque to be applied to the undercarriage if the brakes are engaged.

Autonomous taxiing systems require high torque transfer from the drive shaft(s) to the driven wheels in order to taxi the aircraft. Accordingly, a dog clutch, i.e., a clutch that couples rotating components by interference rather than friction, is generally preferable. However, the high operational loads generated during taxiing cause deflections in the axle and drive shaft. These deflections cause angular misalignment as well as radial offsets between the mating parts of the clutch. As a result, a typical dog clutch known in the art will not properly engage and disengage without large gaps between the teeth of the mating parts.

SUMMARY

In accordance with an embodiment of the present disclosure, a landing gear system is provided. The system includes an axle having an internal cavity and a wheel rotatably coupled to the axle. A drive shaft is mounted within the cavity to be rotatable about an axis. The landing gear system further includes a rod slidably mounted within the drive shaft and a clutch. The clutch has a first portion that is coupled to the rod and rotates with the drive shaft. A second portion of the clutch is fixedly coupled to the wheel. The rod selectively reciprocates along the axis between a first position and a second position to engage and disengage the clutch.

In an embodiment, the clutch is a curvic clutch.

In an embodiment, the landing gear system further includes a motor operably coupled to the drive shaft to rotate the drive shaft about the axis.

In an embodiment, the landing gear system further includes an actuation system coupled to the rod to reciprocate the rod between the first and second positions.

In an embodiment, the actuation system comprises a piston slidably mounted within the drive shaft and coupled to the rod, wherein the cavity is configured to be selectively pressurized to move the piston to drive the rod from the first position to the second position.

In an embodiment, the landing gear system further includes a first alignment fitting associated with the first clutch portion and a second alignment fitting associated with the second clutch portion. The first alignment fitting engages the second alignment fitting to align the first clutch portion with the second clutch portion as the rod moves from the first position to the second position.

In an embodiment, the landing gear system further includes a lockout assembly with a first lockout fitting associated with first clutch portion and a second lockout fitting associated with the second clutch portion. At least one of the first and second lockout fittings is selectively movable between a locked position and an unlocked position. Engagement of the first and second lockout fittings prevents engagement of the first and second clutch portions when the at least one of the first and second lockout fittings is in the locked position.

In accordance with another embodiment of the present disclosure, a landing gear system is provided. The system includes an axle with an internal cavity and a wheel rotatably coupled to the axle. A drive shaft is positioned within the cavity and is rotatable about an axis. A piston is at least partially disposed within the drive shaft and is configured for sliding translation along the axis relative to the drive shaft. The landing gear system further includes clutch with first and second portions. The first portion is coupled to the piston and is configured to rotate about the axis with the drive shaft. The second portion is fixedly coupled to the wheel. The piston selectively reciprocates along the axis between a first position and a second position so that the first clutch portion is disengaged from the second clutch portion when the piston is in the first position and is engaged with the second clutch portion when the piston is in the second position.

In an embodiment, the clutch is a curvic clutch.

In an embodiment, the landing gear system further includes a motor coupled to the drive shaft to rotate the drive shaft about the axis.

In an embodiment, the cavity is configured to be selectively pressurized to move the piston from the first position to the second position and depressurized to move the piston from the second position to the first position.

In an embodiment, the cavity is selectively pressurized by at least one of oil, air, and nitrogen.

In an embodiment, the landing gear system further includes a spring disposed within the axle to bias the piston toward the first position.

In an embodiment, the landing gear system further includes a first alignment fitting associated with the first clutch portion and a second alignment fitting associated with the second clutch portion. The first alignment fitting engages the second alignment fitting to align the first clutch portion with the second clutch portion as the piston moves from the first position to the second position.

In an embodiment, the landing gear system further includes a lockout assembly with first and second lockout fittings. The first lockout fitting is associated with first clutch portion and the second lockout fitting is associated with the second clutch portion. At least one of the first and second lockout fittings is selectively movable between a locked position and an unlocked position. Engagement of the first and second lockout fittings prevents engagement of the first and second clutch portions when the at least one of the first and second lockout fittings is in the locked position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an autonomous taxiing system for an aircraft are set forth below according to technologies and methodologies of the present disclosure. In an embodiment, a drive shaft located within the axle is rotated by a motor mounted to the landing gear. The drive axle selectively engages and disengages with the wheel through a curvic clutch to drive the wheel to taxi the aircraft. In some embodiments, a piston is slidingly disposed within the drive shaft to reciprocate a portion of the curvic clutch between an engaged position and a disengaged position. The piston is driven toward the engaged position by a pressurized fluid within the axle. A spring provides a return force to bias the piston toward the disengaged position.

Figure 1:
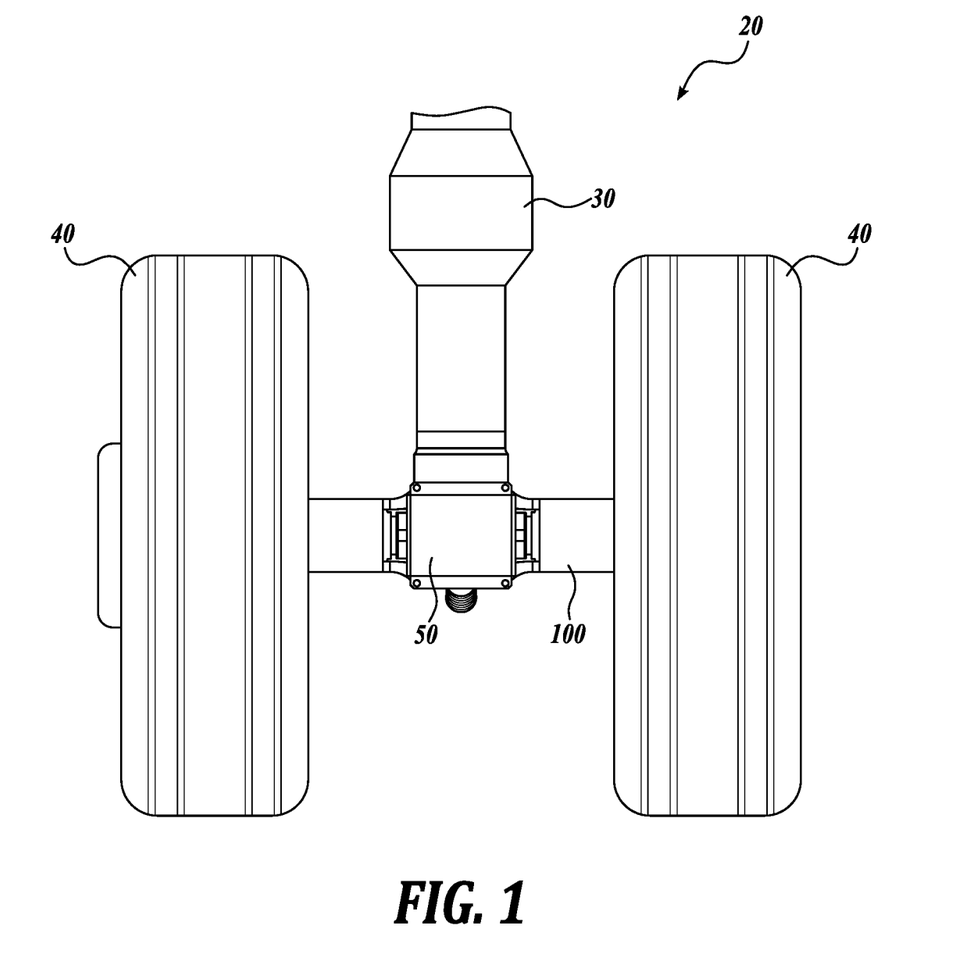
FIG. 1 shows a rear view of a first representative embodiment of a landing gear system for an autonomous taxiing aircraft according to the present disclosure.
Figure 2:
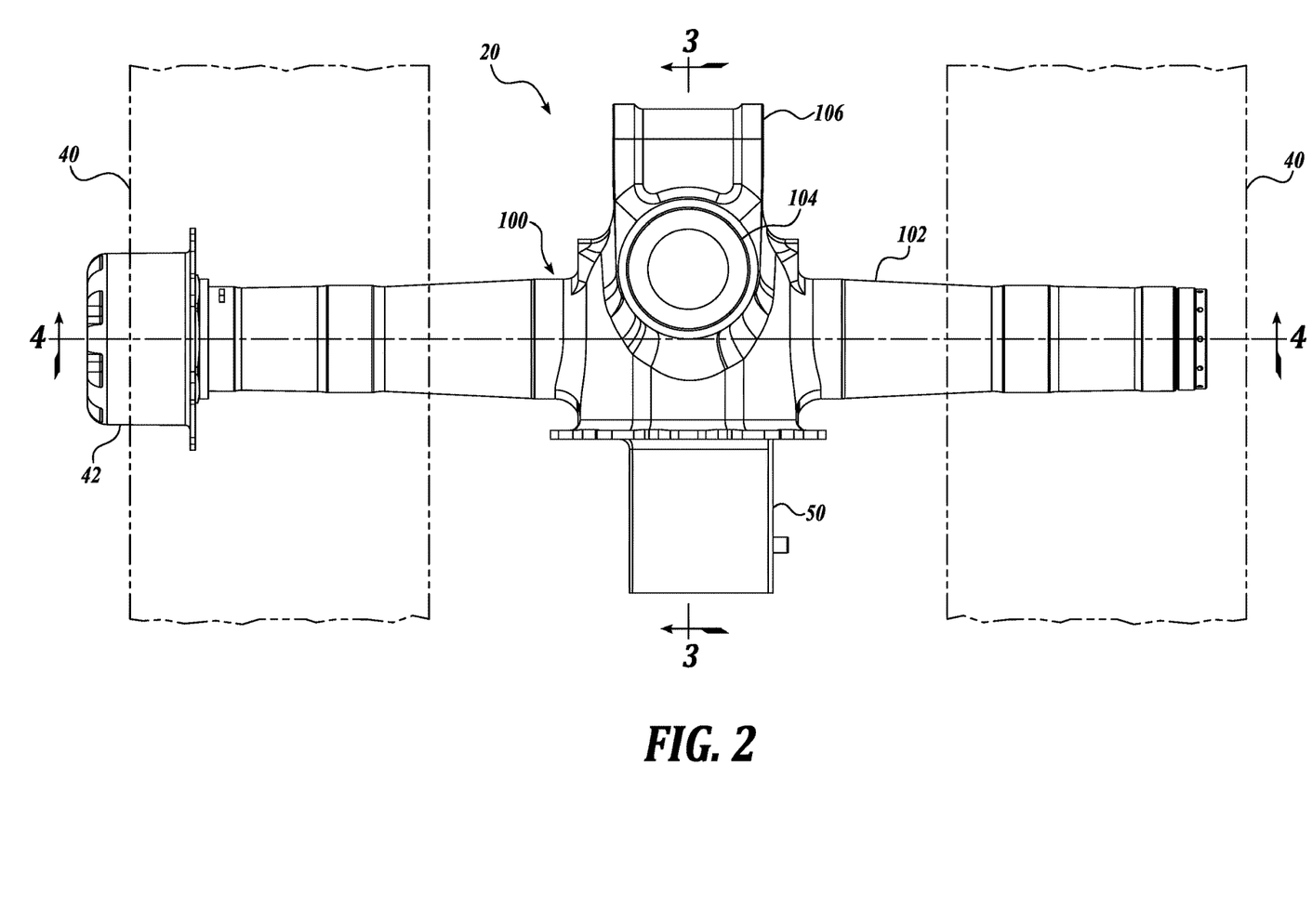
FIG. 2 shows a top plan view of the landing gear system of FIG. 1.

Referring now to FIGS. 1-7, a first representative embodiment of a landing gear system 20 according to the present disclosure is shown. As best shown in FIGS. 1 and 2, the landing gear system 20 includes a strut 30 and an axle assembly 100. One end of the strut 30 is coupled to the aircraft (not shown) and the other end of the strut is coupled to the axle assembly 100 at a strut interface 104 formed in an axle housing 102, as shown in FIG. 2. In the illustrated embodiment, the axle assembly 100 extends laterally outward from the strut 30 and has a wheel 40 rotatably mounted to each end.

As best shown in FIG. 2, a motor 50 is mounted to a rear side of the axle housing 102. As explained in further detail, the motor 50 provides the driving force to rotate one or more of the wheels 40 to taxi the aircraft. As will be described in further detail, at least one of the wheels 40 includes a hub 42 that engages the axle assembly 100. A torque link lug 106 is formed on a forward end of the axle assembly 100 to provide attachment for the lower torque link of a torque link assembly (not shown), which is commonly used in known landing gear configurations.

The illustrated landing gear system 20 is a configuration similar to known main landing gear assemblies used on commercial aircraft. It will be appreciated, however, that the present disclosure is not limited to the illustrated landing gear system. In this regard, embodiments of the disclosed autonomous taxiing system can be utilized with various landing gear systems for different aircraft. In one embodiment the taxiing system is utilized with main landing gear assemblies mounted to the aircraft body or wings. In other contemplated embodiments, the taxiing system drives one or more wheels of a multi-wheel, e.g, four, six, eight, etc., landing gear assembly with a bogie beam. In yet another embodiment the taxiing system is used in conjunction with a single-wheel landing gear assembly. Embodiments are also contemplated in which the motor 50 is positioned forward of the axle assembly 10 or in another suitable location, and/or the torque link assembly is positioned aft of the axle assembly.

Figure 3:
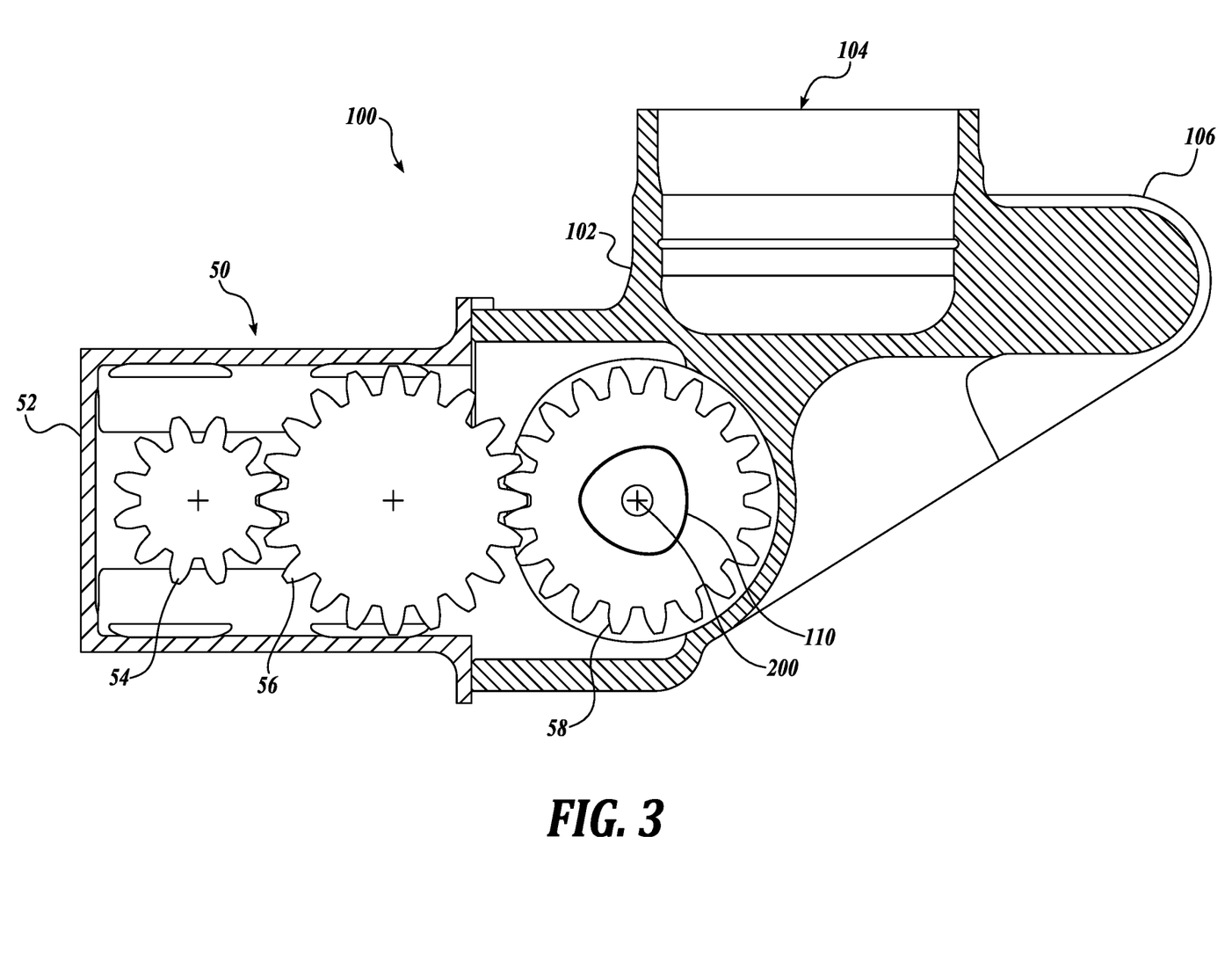
FIG. 3 shows a cross-sectional view of a motor and an axle assembly of the landing gear system of FIG. 2.

Referring now to FIG. 3, which is a cross-sectional view of the system 20 taken along line 3-3 in FIG. 2, the motor 50 includes a housing 52 coupled to an aft side of the axle housing 102 by mechanical fasteners or other suitable means. The motor 50, which may be electric, hydraulic, or any other suitable type of motor, selectively rotates an output gear 54. The output gear 54 is operably coupled to a drive shaft gear 58 rotatably mounted within the axle housing 102 through an intermediate gear 56. The drive shaft gear 58 engages a drive shaft 110 so that the rotation of the drive shaft gear 58 rotates the drive shaft 110 about a common axis 200.

In the illustrated embodiment, the portion of the drive shaft 110 that engages the drive shaft gear 58 has three lobes and nests within a similarly-shaped aperture in the drive shaft gear. In other contemplated embodiments, the drive shaft 110 may be mechanically fastened to or integrally formed with the drive shaft gear 58. Additional configurations may use different numbers and sizes of gears or other transmission elements to transform the output of the motor 50 into rotation of the drive shaft 110 about the axis 200.

Figure 4:
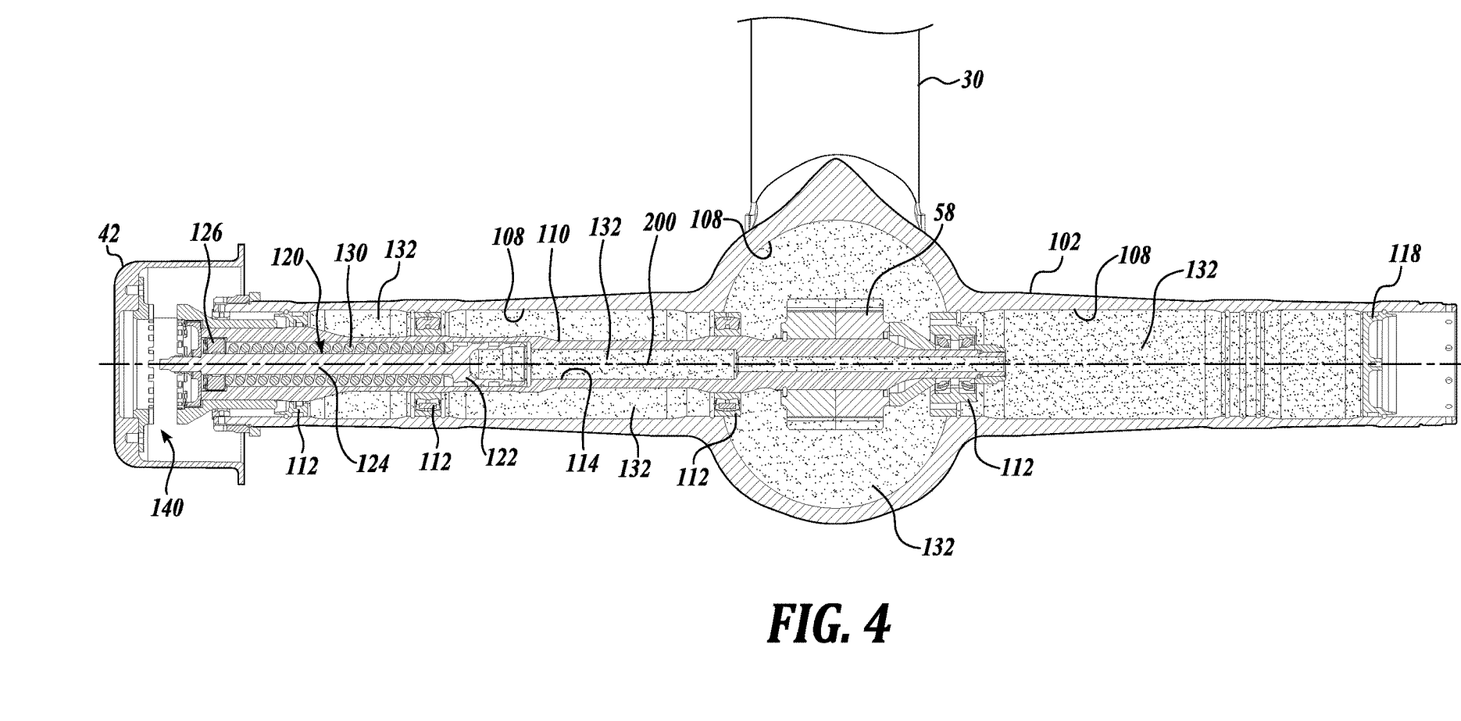
FIG. 4 shows a cross-sectional view of the axle assembly of FIG. 3.

Referring now to FIG. 4, which is a partial cross-sectional rear view taken along line 4-4 of FIG. 2, the landing gear system 20 is shown with portions of the wheels 40 removed for clarity. The axle housing 102 includes an elongate internal cavity 108. The drive shaft 110 is mounted within the cavity 108 via a plurality of bearings 112 to be rotatable about axis 200.

An elongate cavity 114 is formed in the drive shaft 110 and extends along the axis 200 of the drive shaft. A first end of the cavity 114 is in fluid communication with the cavity 108 of the axle housing 102. Slidingly disposed in a second end of the cavity 114 is a piston assembly 120. The piston assembly 120 includes a piston 122 in sliding contact with the wall of the drive shaft cavity 114 and a rod 124 extending from the piston and slidingly supported by a bearing 126 mounted within the drive shaft cavity. A return spring 130 is positioned between the bearing 126 and the piston 122 to provide a biasing force that urges the piston assembly 120 in an inboard direction. As the piston 122 moves in an outboard direction, the spring 130 is compressed between the bearing 126 and the piston 122, and the biasing force provide by the spring increases.

As previously described, the drive shaft cavity 114 is in fluid communication with the cavity 108 of the axle housing 102. In the illustrated embodiment, the cavity 108 is sealed at one end by a plug 118 mounted within the axle housing 102. The cavity 108 is fluid tight and filled with a fluid 132.

In the illustrated embodiment, the fluid 132 is a lubricating oil that lubricates the internal components of the axle assembly 100. The fluid 132 also provides an actuating force to drive the piston assembly 120 from a first (inboard) position to a second (outboard) position. The actuating force is generated by pressurizing the cavity 108 with fluid 132 to drive the piston assembly 120. As the pressure of the fluid 132 increases, the force exerted on the piston 122 increases until the force overcomes the biasing force of the spring 130, at which point the piston moves in an outboard direction. As the pressure of the fluid 132 decreases, the actuating force decreases, and the spring 130 returns the piston assembly 120 to the first position. As will be described in further detail, the reciprocating movement of the piston assembly 120 between the first and second positions engages and disengages a curvic clutch 140 that connects the drive shaft to 110 to a hub 42 of one of the wheels 40. It will be appreciated that while embodiments are disclosed that utilize a curvic clutch 140, other types of clutches may be utilized and should be considered within the scope of the present disclosure. As one nonlimiting example, one alternate embodiment utilizes a clutch that is a dog clutch As described, the illustrated embodiment, utilizes pressurized lubricating oil (or another suitable lubricant) both to lubricate the internal components of the axle assembly 100 and to provide an actuating force that drives the piston assembly 120 from the first position to the second position. In another contemplated embodiment, the cavity 108 of the axle assembly 100 includes an amount of lubricating fluid suitable to lubricate the internal components of the axle assembly 100, and the remainder of the cavity is filled with dry air, nitrogen, or another suitable gas. The cavity 108 is pressurized with the gas to pneumatically actuate the piston 122 to engage the curvic clutch 140 and is vented to disengage the curvic clutch 140.

It will be appreciated that the illustrated configuration to engage and disengage the curvic clutch is exemplary only. In this regard, other configurations are contemplated in which solenoids, magnetic actuators, hydraulic actuators, or any other suitable actuators are utilized to move the curvic clutch between the engaged and disengaged positions, and such configurations should be considered within the scope of the present disclosure.

Figure 5:
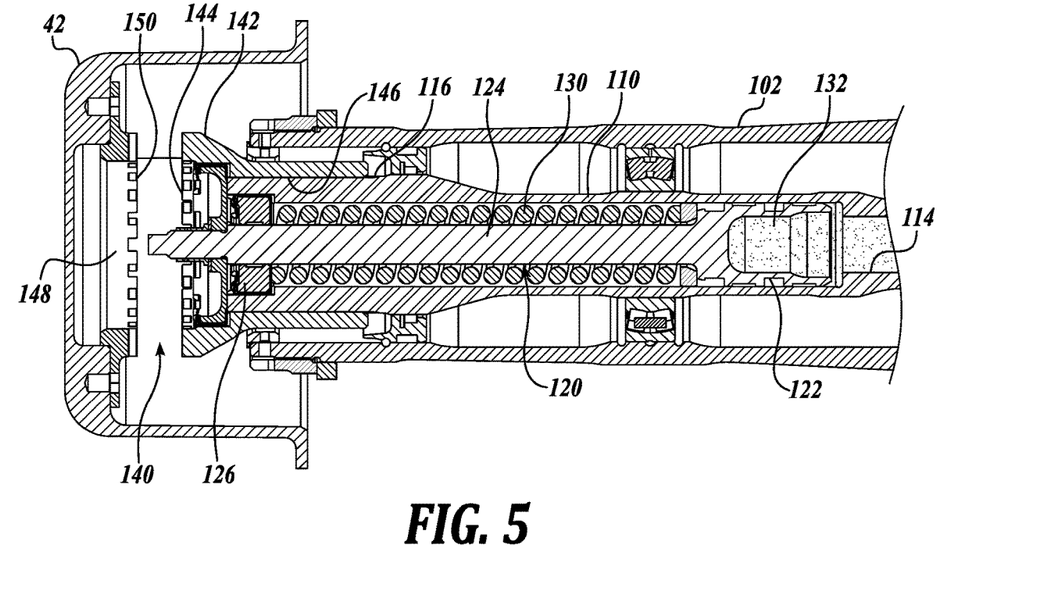
FIG. 5 shows a partial cross-sectional view of the axle assembly of FIG. 4, wherein a curvic clutch is in a disengaged position.
Figure 6:
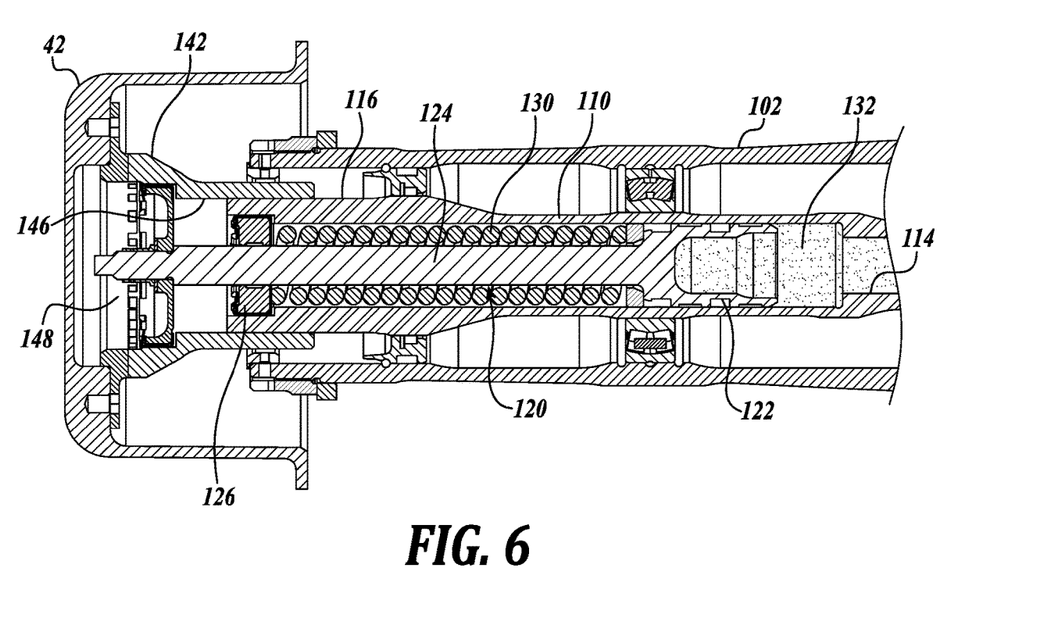
FIG. 6 shows a partial cross-sectional view of the axle assembly of FIG. 4, wherein the curvic clutch is in an engaged position.
Figure 7:
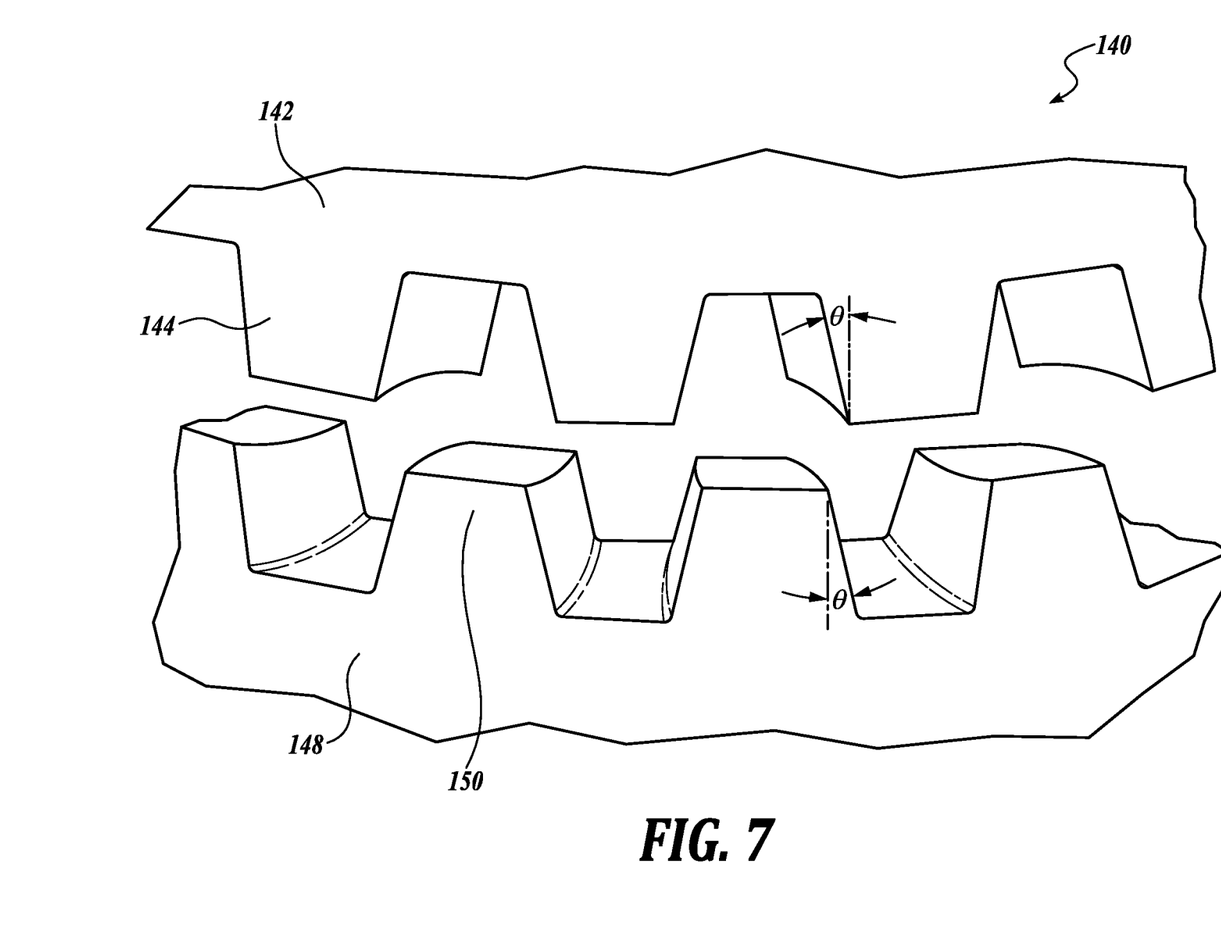
FIG. 7 shows a partial isometric view of an alternate embodiment of the curvic clutch of FIG. 5.

Referring now to FIGS. 5-7, a curvic clutch 140 selectively engages and disengages the drive shaft 110 to one of the wheels 40. More specifically, the curvic clutch 140 includes a first portion 142 associated with the drive shaft 110 and a second portion 148 associated with the hub 42, such that the wheel turns independent of the drive shaft when the curvic clutch is disengaged (FIG. 5), and rotation of the drive shaft drives the wheel when the curvic clutch is engaged (FIG. 6).

The first clutch portion 142 is slidably mounted to the drive shaft 110 by a splined connection. More specifically, the drive shaft 110 extends partially through a central opening formed in the first clutch portion 142 so that splines 146 formed in the first clutch portion engage corresponding splines 116 formed on an exterior surface of the drive shaft 110. The engagement of the splines 146 and 116 causes the first clutch portion 142 to rotate about axis 200 with the drive shaft, while also allowing the first clutch portion to translate relative to the drive shaft in the direction of the axis 200. The first clutch portion 142 is also coupled to the rod 124 of the piston assembly 120 so that when the piston assembly reciprocates between the first and second positions, the first clutch portion reciprocates between the disengaged and engaged positions, respectively.

The second clutch portion 148 is fixedly coupled to a hub 42 that is itself a component of the wheel 40 (see FIG. 2) and rotates with the wheel. The illustrated hub 42 is a hubcap that is reinforced to be able to transfer torque loads from the drive shaft 110 to the wheel 40. In another embodiment, the second clutch portion 148 is coupled directly to the rim of the wheel 40. In another embodiment, the second clutch 148 portion is indirectly coupled to the wheel 40 by a known transmission, gearbox, or other suitable configuration that transfers rotation of the second clutch portion to the wheel 40.

In the illustrated embodiment, the clutch 140 is a curvic clutch of the type disclosed in U.S. Pat. No. 2,384,582, issued to Wildhaber on Sep. 11, 1945, and U.S. Pat. No. 6,672,966, issued to Muju et al. on Jan. 6, 2004, the disclosures of which are incorporated herein by reference. As best shown in FIG. 7, the first clutch portion 142 includes a plurality of teeth 144 formed so that the sides of the teeth are concave. The second clutch portion 148 has a corresponding plurality of teeth 150 formed so that the sides of the teeth are convex. When the first and second clutch portions 142 and 148 are engaged, each concave tooth surface on the first clutch portion mates with a corresponding convex tooth surface on the second clutch portion. The inclusion of mating concave and convex surfaces advantageously provides a self-centering coupling with larger contact surfaces between the clutch portions.

The teeth 144 and 150 of the first and second clutch portions 142 and 148, respectively, have a tooth angle θ, which is the angle measured between the side of the tooth and a plane normal to the face the clutch, as shown in FIG. 7. The teeth 144 and 150 of the curvic clutch 140 can be machined at a variety of angles. FIGS. 5 and 6 show a first embodiment with a straight cut set of teeth, i.e. teeth with a 0° tooth angle θ. However, if the clutch disengages under load, the return spring 130 must be sized to overcome the tooth friction load resulting from the tooth coefficient of friction and the normal force on the teeth (which is directly proportional to the applied shaft torque). With straight cut teeth there is no axial force applied to the mobile clutch as a result of shaft torque. FIG. 7 shows another embodiment of a clutch 140 with tooth angles greater than 0°. As tooth angles greater than 0° are utilized, a 'throw out' axial force is produced as a function of the torque applied by the drive shaft 110. This axial force acts to disengage the clutch 140, which allows for the use of a smaller return spring 130. In one embodiment, the tooth angle is 7°. In another embodiment, the tooth angle is in the range of 5° to 15°.

To utilize the autonomous taxiing capabilities of the disclosed landing gear system 20, the cavity 108 of the axle housing 102 is pressurized to engage the curvic clutch 140. With the curvic clutch 140 engaged, the motor 50 is selectively powered to drive one or more wheels 40 of the landing gear system 20. By using the motor 50 to drive the wheels 40 forward or backward, a pilot can taxi the aircraft without a tow tractor and without using the aircraft engines. When the taxiing is completed, the axle housing 102 is depressurized, and the curvic clutch 140 returns to the disengaged position. With the curvic clutch disengaged, the wheels 40 of the aircraft are effectively isolated from motor 40 and other landing gear system components related to autonomous taxiing functionality.

Figure 8:
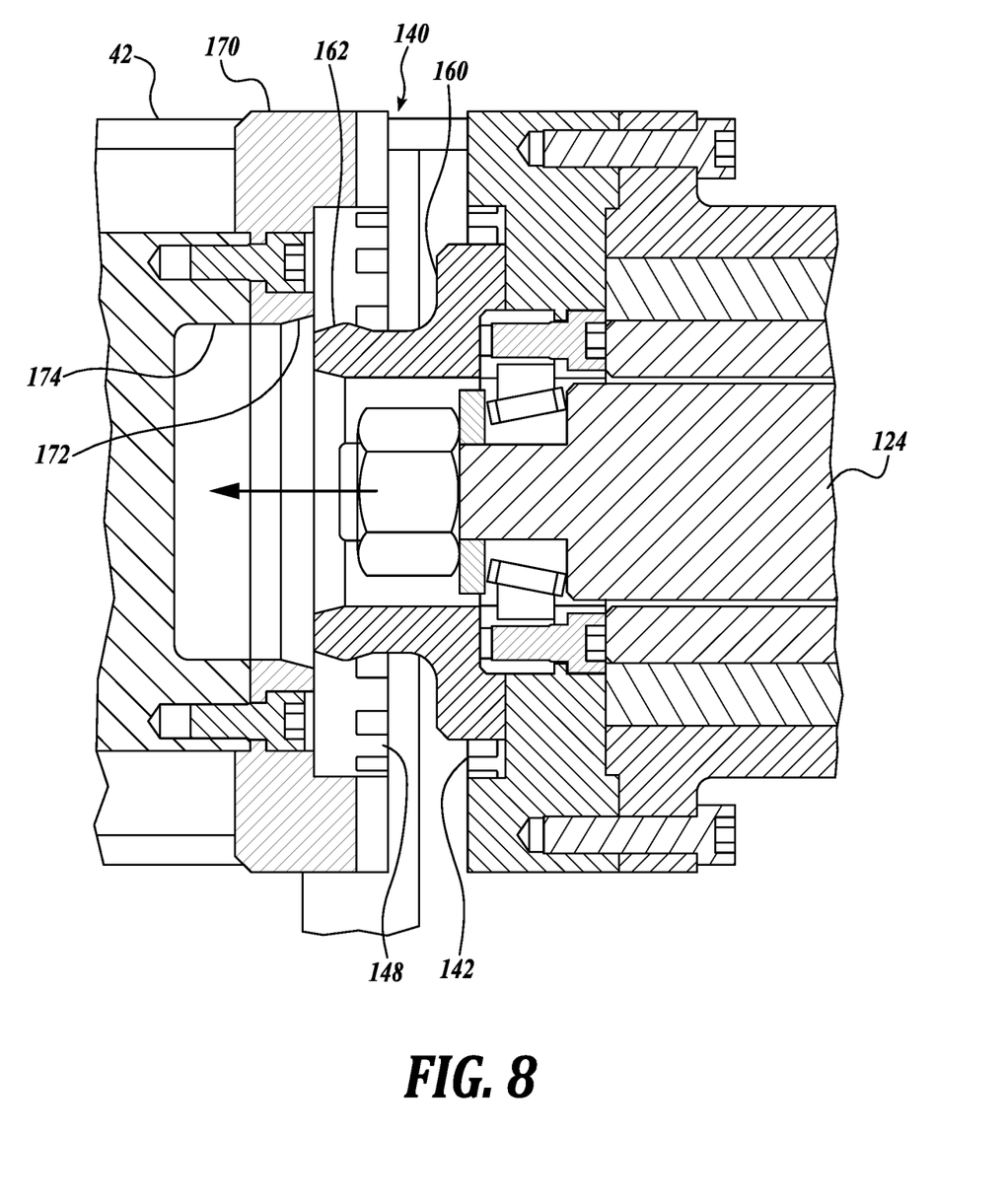
FIG. 8 shows a partial cross-sectional view of a second representative embodiment of the axle assembly of FIG. 4, wherein the axle assembly includes first and second alignment fittings.

Due to the large deflections of aircraft landing gear axles, there will sometimes be some misalignment of the first and second clutch portions 142 and 148. This misalignment can be angular as well radial. FIG. 8 shows an embodiment of a curvic clutch 140 with alignment features that align the first and second clutch portions 142 and 148 as the curvic clutch 140 moves from the disengaged position to the engaged position.

As shown in FIG. 8, a first alignment fitting 160 is coupled to the first clutch portion 142. The first alignment fitting 160 includes a base mounted to or integrally formed with the first clutch portion. A generally cylindrical portion of the first alignment fitting 160 extends axially from the base toward the second clutch portion 148. An external chamfer formed on the end of the cylindrical portion defines a frustoconical first alignment surface 162.

A second alignment fitting 170 is coupled to the hub 42 or the second clutch portion 148. The second alignment fitting includes a cylindrical recess defining an inner surface 174. The inboard end of the recess includes a chamfer that defines a second alignment surface 172.

As the curvic clutch 140 moves from a disengaged position to the engaged position, i.e., when the first clutch portion 142 moves toward the second clutch portion 148, the first alignment surface 162 of the first alignment fitting 160 contacts the second alignment surface 172 of the second alignment fitting 170, even in the presence of angular and/or radial misalignment. As the first clutch portion 142 continues to move toward the second clutch portion 148, the first alignment surface 162 slides along the second alignment surface 172 and then the inner surface 174 of the second alignment fitting. Engagement of the first alignment fitting 160 with the second alignment fitting 170 in this manner aligns the first and second clutch portions 142 and 148 as the curvic clutch 140 moves toward the engaged position.

Because of the sliding contact between the of the first alignment fitting 160 with the second alignment fitting 170 as the curvic clutch 140 engages and disengages, some embodiments will utilize dissimilar materials for the first and second alignment fittings. In an embodiment, one of the alignment fittings is formed from or coated with nitrided steel, and the other alignment fitting is formed from or coated with a copper alloy such as aluminum nickel bronze or spinoidally cast aluminum nickel tin. Other embodiments using other known materials suitable for interacting bearing surfaces are contemplated and should be considered within the scope of the present disclosure.

It will be appreciated that the illustrated alignment features are representative only and should not be considered limiting. In an embodiment, the positions of the first and second alignment fittings 160 and 170 are reversed, so that the alignment fitting coupled to the drive shaft receives the alignment fitting coupled to the wheel. In an embodiment, the recess formed in the second alignment fitting is conical, frusto-conical, or any other suitable shape. These and other variations of fittings that alight the first and second clutch portions 142 and 148 are contemplated and should be considered within the scope of the present disclosure.

Figure 9:
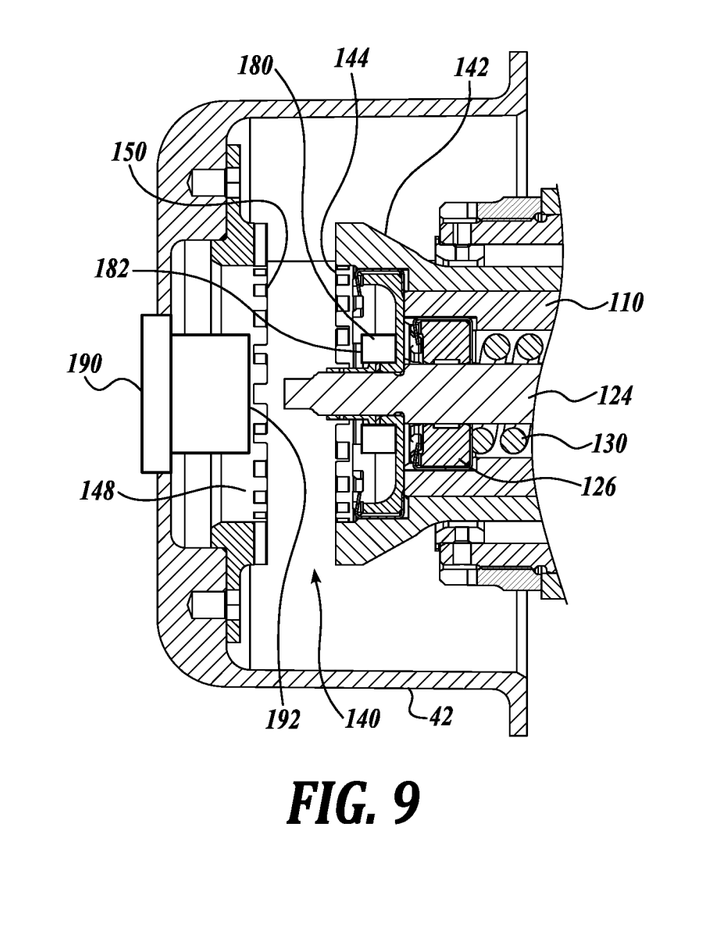
FIG. 9 shows a partial cross-sectional view of a third representative embodiment of the axle assembly of FIG. 4, wherein the axle assembly includes a clutch lockout assembly in a disabled position.
Figure 10:
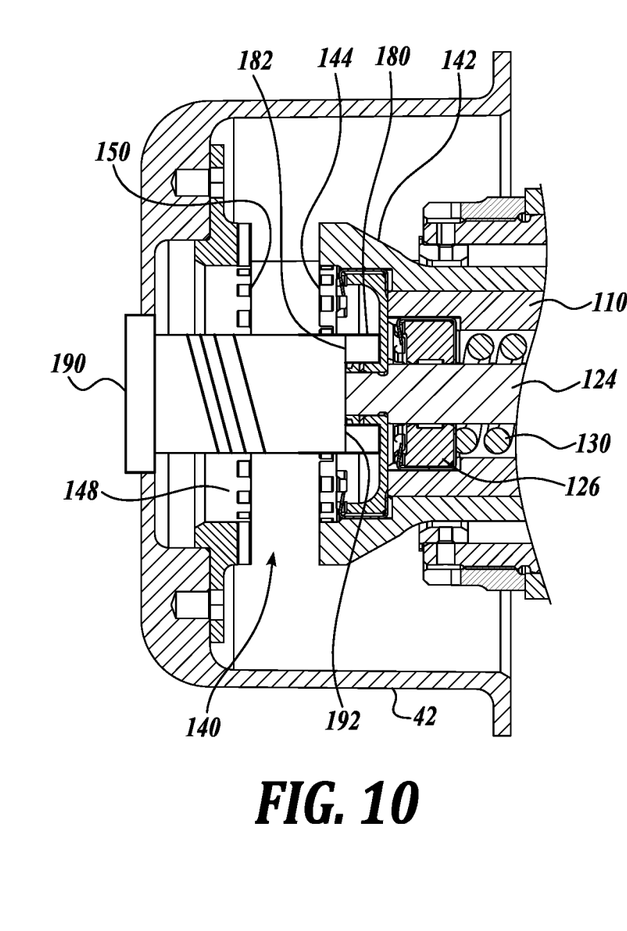
FIG. 10 shows a partial cross-sectional view of the axle assembly of FIG. 9, wherein the clutch lockout assembly is in an enabled position.

Referring now to FIGS. 9 and 10, an illustrated embodiment includes a mechanical lockout that prevents engagement of the clutch 140. The lockout system includes a first lockout fitting 180 coupled to the first clutch portion 142. In the illustrated embodiment, the first lockout fitting 180 is a cylindrical fitting that has a first surface 182 on the end closest to the second clutch portion. A second lockout fitting 190 is positioned on the hub 42 and has a second surface 192 on the end closest to the first lockout fitting 180. The second lockout fitting 190 is extendable between a disabled (retracted) position, shown in FIG. 9, and an enabled (extended) position, shown in FIG. 10. In the disabled position, i.e., when the lockout feature is disabled, the clearance between the first and second lockout fittings 180 and 190 is such that the lockout fittings do not contact each other as the curvic clutch 140 moves from the disengaged position to the engaged position.

To enable the lockout, the second lockout fitting 190 is moved to the extended position. With the second lockout fitting 190 in the extended position, the first surface 182 engages the second surface 192 as the curvic clutch 140 moves toward the engaged position. This engagement occurs before the first clutch portion 142 engages the second clutch portion 148 and prevents further movement of the clutch 140 toward the engaged position. As a result, engagement of the curvic clutch 140 is prevented.

The illustrated second lockout fitting 190 is a cam or screw driven mechanism that extends and retracts through rotation of a cap. In other contemplated embodiments, the second lockout fitting is a translating cylinder configured to be pinned in the enabled position from the outside, a device that is pushed inwards and rotated to lock into detents, or a threaded fitting adjustably mounted to the hub. These and other lockout configurations that selectively prevent engagement of the curvic clutch 140 are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A landing gear system, comprising:
   an axle comprising an internal cavity;
   a wheel rotatably coupled to the axle;
   a drive shaft disposed within the cavity, the drive shaft being rotatable about an axis;
   a rod slidably mounted within the drive shaft; and
   a clutch, comprising:
      a first clutch portion fixedly coupled to the rod and configured to rotate with the drive shaft, and
      a second clutch portion fixedly coupled to the wheel,
   wherein, the rod selectively reciprocates along the axis between a first position and a second position, the first clutch portion being disengaged from the second clutch portion when the rod is in the first position, the first clutch portion engaging the second clutch portion when the rod is in the second position.

2. The landing gear system of claim 1, wherein the clutch is a curvic clutch.

3. The landing gear system of claim 1, further comprising a motor operably coupled to the drive shaft to rotate the drive shaft about the axis.

4. The landing gear system of claim 1, further comprising an actuation system coupled to the rod to reciprocate the rod between the first and second positions.

5. The landing gear system of claim 4, wherein the actuation system comprises a piston slidably mounted within the drive shaft and coupled to the rod, wherein the cavity is configured to be selectively pressurized to move the piston, movement of the piston driving the rod from the first position to the second position.

6. The landing gear system of claim 1, further comprising a first alignment fitting associated with the first clutch portion and a second alignment fitting associated with the second clutch portion, the first alignment fitting engaging the second alignment fitting to align the first clutch portion with the second clutch portion as the rod moves from the first position to the second position.

7. The landing gear system of claim 1, further comprising a lockout assembly, the lockout assembly comprising:
   a first lockout fitting associated with first clutch portion; and
   a second lockout fitting associated with the second clutch portion,
   wherein at least one of the first and second lockout fittings is selectively movable between an enabled position and a disabled position, engagement of the first and second lockout fittings preventing engagement of the first and second clutch portions when the at least one of the first and second lockout fittings is in the enabled position.

8. The landing gear system of claim 1, wherein the first and second clutch portions comprise a plurality of teeth, each of the plurality of teeth having a tooth angle in the range of 5° to 15°.

9. A landing gear system, comprising:
   an axle comprising an internal cavity;
   a wheel rotatably coupled to the axle;
   a drive shaft disposed within the cavity, the drive shaft being rotatable about an axis;
   a piston at least partially disposed within the drive shaft and configured for sliding translation along the axis relative to the drive shaft; and
   a clutch, comprising:
      a first clutch portion coupled to the piston and configured to rotate about the axis with the drive shaft; and
      a second clutch portion fixedly coupled to the wheel,
   wherein, the piston selectively reciprocates along the axis between a first position and a second position, the first clutch portion being disengaged from the second clutch portion when the piston is in the first position, the first clutch portion clutch engaging the second clutch portion when the piston is in the second position.

10. The landing gear system of claim 9, wherein the clutch is a curvic clutch.

11. The landing gear system of claim 9, further comprising a motor operably coupled to the drive shaft, the motor selectively rotating the drive shaft about the axis.

12. The landing gear system of claim 9, wherein the cavity is configured to be selectively pressurized to move the piston from the first position to the second position and depressurized to move the piston from the second position to the first position.

13. The landing gear system of claim 12, wherein the cavity is selectively pressurized by at least one of oil, air, or nitrogen.

14. The landing gear system of claim 9, further comprising a spring disposed within the axle, the spring biasing the piston toward the first position.

15. The landing gear system of claim 9, further comprising a first alignment fitting associated with the first clutch portion and a second alignment fitting associated with the second clutch portion, the first alignment fitting engaging the second alignment fitting to align the first clutch portion with the second clutch portion as the piston moves from the first position to the second position.

16. The landing gear system of claim 9, further comprising a lockout assembly, the lockout assembly comprising:
   a first lockout fitting associated with first clutch portion; and
   a second lockout fitting associated with the second clutch portion,
   wherein at least one of the first and second lockout fittings is selectively movable between an enabled position and a disabled position, engagement of the first and second lockout fittings preventing engagement of the first and second clutch portions when the at least one of the first and second lockout fittings is in the enabled position.

17. The landing gear system of claim 9, wherein the first and second clutch portions comprise a plurality of teeth, each of the plurality of teeth having a tooth angle in the range of 5° to 15°.

* * * * *